United States Patent Office

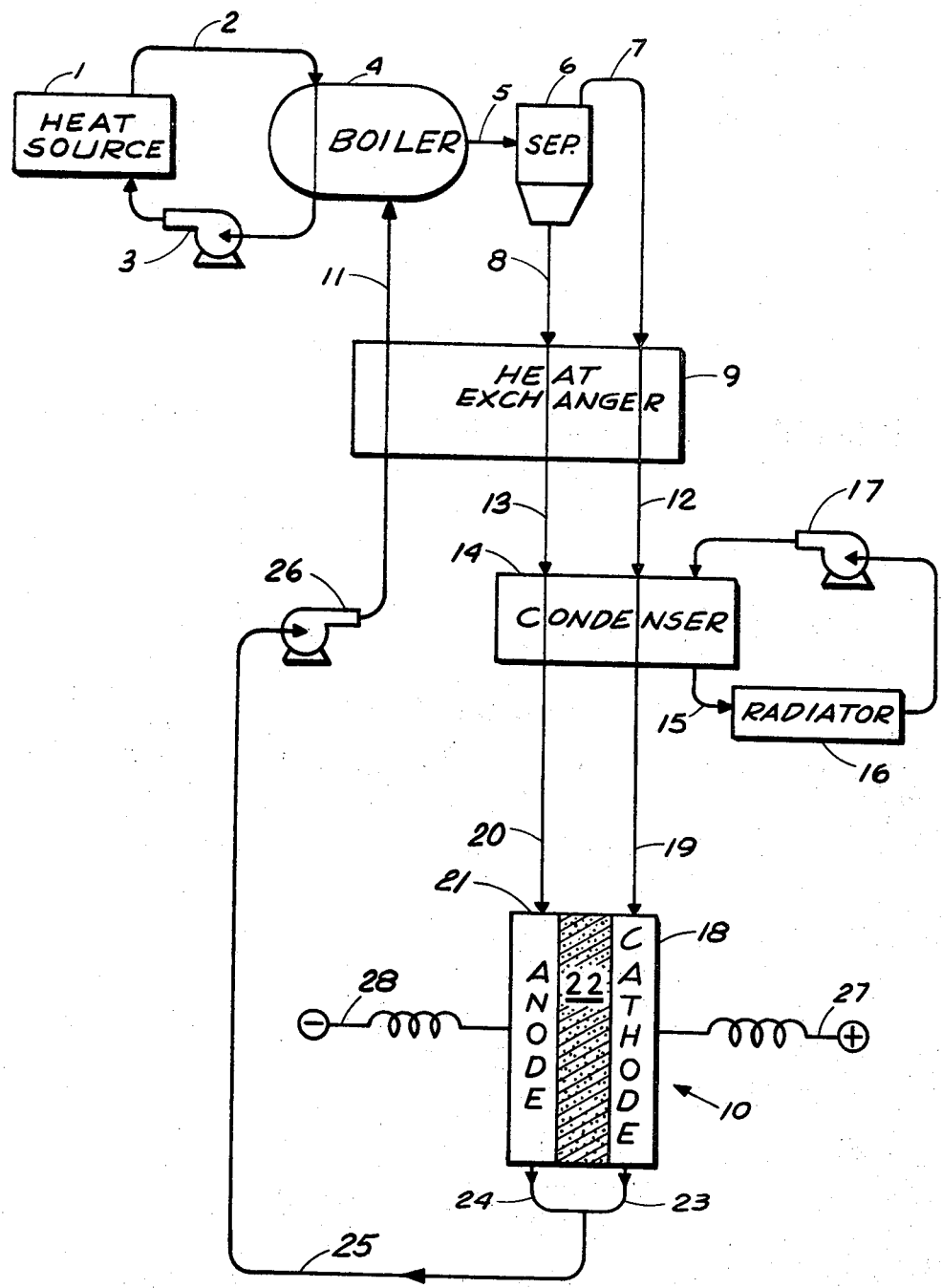

3,419,436
Patented Dec. 31, 1968

3,419,436
POROUS MATRIX FOR GALVANIC CELL
Howard L. Recht, Northridge, and Marlowe L. Iverson, Simi, Calif., assignors to North American Rockwell Corporation, a corporation of Delaware
Filed Apr. 2, 1965, Ser. No. 444,956
7 Claims. (Cl. 136—100)

ABSTRACT OF THE DISCLOSURE

A porous matrix-electrolyte element for use in a sodium amalgam galvanic cell. The element consists of a porous beryllium oxide matrix which contains therein a ternary or quaternary sodium salt system, preferably a fusible ternary salt mixture of eutectic composition consisting essentially of, in mole percent, 58±1 sodium cyanide, 30±1 sodium iodide, and 12±1 sodium fluoride.

---

This invention relates to a porous ceramic matrix containing a fusible alkali-metal salt for use as an electrolyte element in a thermally regenerative system. More particularly it relates to a novel alkali metal-amalgam galvanic cell or battery utilizing this electrolyte-matrix combination.

A thermally regenerative energy conversion system is a closed cycle heat engine for converting heat energy to electricity without the use of moving parts such as turbines or other rotating machinery. Galvanic cells have been heretofore considered for use as components in such thermally regenerative systems. See "The Thermally Regenerative Liquid-Metal Cell" by B. Agruss, Journal of the Electrochemical Society, vol. 110, pp. 1097–1103 (1963); "Mercury Space Power Systems" by R. E. Henderson and E. H. Hietbrink, in Direct Conversion, 1962 Pacific Energy Conversion Conference Proceedings, pp. 16–1 to 16–12 (1962). Generally, such cells have been of limited practical interest because of the presence of several of the following deficiencies: low single cell voltage, low cell current density, difficulty of materials handling and regeneration, lack of compatibility with usable heat sources, and cell component corrosion resulting in short cell life.

A major problem of cell component corrosion results from the difficulty of providing a suitable electrolyte and a container therefor. Because both the electrodes and the electrolyte are liquid in the alkali metal-amalgam galvanic cell, it is necessary to prevent mixing of the electrodes and electrolyte in the cell in order to obtain a continuous source of electric power. At the same time, there must be ion transport through the electrolyte within the cell in order for the cell to function. Thus means to immobilize the electrolyte and yet permit ion transport are required. Various porous ceramic materials have been used or suggested for use as matrices for containing the molten electrolyte for use in a high-temperature galvanic cell. However, suggested materials such as aluminum oxide ($Al_2O_3$) and magnesium oxide (MgO) have been deficient in several respects. They are also particularly vulnerable to attack by molten oxygen-containing electrolytes as well as by the alkali metal-amalgam electrolytes. Thus cell life has proven unsatisfactory.

Accordingly, it is an object of the present invention to provide a galvanic cell for use in a thermally regenerative system that minimizes prior art disadvantages heretofore present.

Another object is to provide a galvanic cell with improved resistance to cell component corrosion.

Still another object is to provide a cell with a relatively high power to weight ratio.

Still another object is to provide a galvanic cell with increased cell life for both space and terrestrial applications.

Yet another object is to provide a combined matrix-electrolyte element of improved stability.

Still another object is to provide a porous ceramic matrix material of improved thermal conductivity.

In accordance with this invention, a beryllium oxide porous ceramic is provided as a matrix in which is absorbed a suitable non-oxidizing molten electrolyte for use in a high-temperature thermally regenerative galvanic cell. The beryllium oxide-electrolye combination provides an extremely stable immobilized electrolyte element for use in a galvanic cell.

The galvanic cell of this invention has an anode consisting of an alkali metal-rich amalgam of a selected alkali metal, the cathode consists of an alkali metal-poor amalgam of said alkali metal, and the selected alkali-metal salt electrolyte is contained in a porous beryllium oxide matrix separating the anode and cathode electrodes. In order to provide a particularly stable, resistant element, the anion of the alkali-metal salt electrolyte is selected from the class consisting of halides, cyanide, carbonate and mixtures thereof, carbonate being present only as a minor constituent. The cathode and anode amalgams and the electrolyte salt contained in the beryllium oxide matrix are all molten at the normal operating temperature of the cell. The term "cell" as used herein is broadly intended also to include a "battery" e.g., an assemblage in series or parallel arrangement of two or more electric cells.

The use of beryllium oxide as the porous ceramic material for containing the electrolyte provides the following advantages: It is at least equal to MgO and superior to $Al_2O_3$ in resistance to reduction by active anodic materials such as the alkali metals and their amalgams. It surpasses both of these other ceramic materials in thermal conductivity. Thereby hot spots in the cells may be avoided and waste heat can be rejected more easily. Since the beryllium oxide is lower in density than either aluminum oxide or magnesium oxide, a cell of minimal weight may be obtained. Further, the combination of the beryllium oxide matrix with the selected electrolyte provides a particularly stable, non-corrosive electrolyte element.

The beryllium oxide employed should be of high purity, e.g., over 98 percent pure with impurities limited to MgO or other chemically resistant oxides. Typically, a material of 99.8 percent BeO is used. Porosity of the BeO may be in the range of 30–70 percent, with 45–55 percent being typical. In general, the highest porosity consistent with adequate strength is preferred. Tortuosity, i.e., effective pore length per unit of thickness, should be low, values of 1.5 to 3 being typical.

While this invention is broadly directed to an energy conversion process and system utilizing an alkali metal-amalgam cell or battery, with one-stage or multiple-stage regeneration, it is preferred for most advantageous operation that the alkali metal component of the anode, cathode and electrolyte be sodium. In its more specific aspects, it is particularly preferred that the anode amalgam of the galvanic cell contain between 15 and 80 atom percent sodium, the cathode amalgam contain up to 10 atom percent sodium and the electrolyte consist of a mixed ternary or quaternary sodium salt system, the anionic components being selected from the aforementioned class.

Other objects, advantages, and features of the invention will appear from the following description of a preferred embodiment of the invention relating to a sodium-amalgam cell, wherein the sole figure of the drawing is a schematic representation of a thermally regenerative alloy cell system employing this preferred sodium-amalgam galvanic cell utilizing a porous beryllium oxide matrix containing the ternary or quaternary sodium salt system.

Referring to the drawing, a heat source 1 is used to heat a fluid which is circulated in a closed conduit loop 2 by means of a pump 3 through a boiler 4. Conveniently, for space applications, the heat source is a nuclear reactor and the circulating heat-transfer fluid is sodium-potassium liquid metal. This fluid may be circulated utilizing an electromagnetic pump, thereby eliminating moving mechanical parts. Heat source 1 may also be a radioisotope, e.g., plutonium–238 for a long-term space mission or cerium–144 for a short-term mission. These heat sources are also suitable for terrestrial applications. For other applications, particularly where conventional sources of heat are employed such as fossil fuels, the heat source loop may be eliminated and the boiler heated directly.

Where sodium is the alkali metal used, a boiler temperature below the boiling point of sodium and preferably between 1200° F. and 1400° F. (650–750° C.) is maintained. In this preferred embodiment, the sodium-mercury mixture in the boiler contains preferably between 10 and 20 atom percent sodium. The heated sodium-amalgam mixture in boiler 4 passes through a conduit 5 to a separator 6, where the mixture is separated into a sodium-poor vapor, e.g., mercury vapor containing between 0 and 10 atom percent sodium, and a sodium-rich liquid amalgam containing between 15 and 80 atom percent sodium. The specific composition of the separated components is determined by boiler efficiency and the temperature and pressure maintained in the boiler. The separator is conveniently a centrifugal cyclone type because of its high collection efficiency for space applications. Where the source temperature is high, above 1400° F., the mercury vapor stream may contain excessive amounts of sodium. This can be minimized by using at least a two-stage boiler-separator.

At a temperature of 1300° F. and a system pressure of about 125 p.s.i.a. the mercury vapor passing through an overhead conduit 7 of separator 6 contains approximately 0.4 atom percent (a/o) sodium. This sodium-poor mercury vapor, following condensation, constitutes the cathode stream. The anode stream consists of molten sodium-amalgam which passes through a bottom conduit 8. At 1300° F. this liquid stream contains approximately 37.5 a/o sodium.

The anode and cathode streams pass through a heat exchanger 9 wherein heat is given up to a recycle effluent stream from a galvanic cell 10, this stream being returned to boiler 4 through a conduit 11. The cathode and anode streams pass from heat exchanger 9 through respective conduits 12 and 13 to a condenser-cooler 14 wherein the streams are further cooled and the mercury vapor of the cathode stream is condensed.

For convenience in schematic representation, condenser-cooler 14 has been shown as a separate unit from heat exchanger 9. Similarly, boiler 4 has been shown as a separate unit from separator 6. However, for optimizing system weight and efficiency, particularly for space applications, it may be desirable to combine the boiler and separator in one unit and also to combine the heat exchanger and condenser-cooler. Since the system described herein is a heat engine that is Carnot-cycle limited, its efficiency is increased by maintaining a maximum feasible difference in temperature between that of boiler 4 and that at which galvanic cell 10 is operated. Waste heat may be additionally rejected to space by means of a fluid circulating through a closed conduit loop 15 to a radiator 16, circulated by means of a pump 17. The condenser-cooler 14 and radiator 16 may be combined where direct radiation of waste heat is desired. Thereby, circulation of a heat-transfer liquid through external loop 15 is eliminated.

The sodium-poor amalgam stream enters a cathode compartment 18 of galvanic cell 10 by way of conduit 19. Similarly, the sodium-rich amalgam stream is conducted by way of conduit 20 to an anode compartment 21 of galvanic cell 10.

An electrolyte compartment 22, which separates the cathode and anode compartments 18 and 21, consists of a porous beryllium oxide ceramic matrix in which the molten electrolyte is contained. It is a particularly important feature of this invention, in order to insure maximum cell life, high efficiency and freedom from corrosion, which combined features result in a cell of practical utility, that the electrolyte element consist of a porous beryllia matrix in which a molten anhydrous alkali-metal salt is contained that is compatible with the beryllium oxide. Such a salt is substantially non-oxidizing and has its anionic components selected from the class consisting of halide, cyanide, carbonate, and mixtures thereof, carbonate where present being only a minor consituent in the mixture. Thereby, corrosion of the beryllium oxide matrix is minimal, and the other advantages associated with the use of a beryllium oxide matrix such as high thermal conductivity and low weight are readily obtained. Mixed ternary and quaternary sodium salts containing these anionic components are molten at relatively low temperatures, thereby permitting more efficient operation of a sodium-amalgam cell.

Galvanic cell 10 is maintained at a temperature that is suitably lower than the boiler temperature but sufficient to maintain the cathode and anode amalgams and the electrolyte in a molten state. In the galvanic cell, sodium ions from the sodium-rich amalgam in the anode compartment migrate through the molten electrolyte to the cathode compartment where they unite with the mercury to form a sodium-poor amalgam of higher sodium content than originally present in the cathode compartment. At the same time, the sodium-rich amalgam in the anode compartment is depleted to form a sodium-poor amalgam. The sodium-poor amalgam effluent from the cathode compartment, emerging from a conduit 23, and the sodium-poor effluent amalgam of the anode compartment, emerging from a conduit 24, are combined and conducted by way of a conduit 25 utilizing a pump 26 through heat exchange 9, and then returned by way of conduit 11 to boiler 4 for regeneration and recycle in the system. The anode and cathode effluent streams may be of the same or different composition depending on the relative flow rates selected of these streams based on considerations of over-all efficiency and specific power output.

An electrical load (not shown) is conveniently connected across a positive terminal 27 and a negative terminal 28 of the galvanic cell. Since heat is being continually supplied by heat source 1 and electricity is being removed from the cell by way of terminals 27 and 28, this thermally regenerative system provides an efficient continuous energy conversion process for the conversion of heat to electricity. The following reactions (equations not balanced) occur in the system during operation.

Boiler (and regenerative heat exchanger):

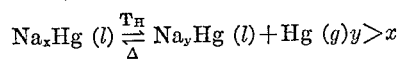

Separator:

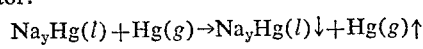

Condenser:

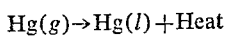

Galvanic cell:
(a) Overall

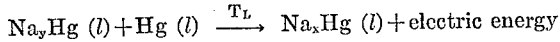

(b) Anode (negative electrode)

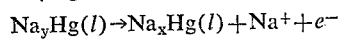

(c) Electrolyte

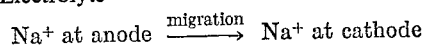

(d) Cathode (positive electrode)

$$Na^+ + Hg + e^- \rightarrow Na_xHg(l)$$

The sodium-amalgam mixture may be employed as the working medium over a broad range of heat source ($T_H$) temperature and cell ($T_L$) and heat-sink temperatures. However, for preferred operating conditions, the heat source utilized is best available in the range 550° C. to 900° C. with a particularly preferred range from 600° C. to 725° C. The cell temperature is best utilized in the range 250° C. to 600° C. with a preferred range from 360° C. to 500° C. depending on the freezing point of amalgam and electrolyte. The heat-sink temperature accordingly will be sufficiently lower than the cell temperature to permit rejection of all degraded heat.

Where the molten electrolyte contained in the high porosity beryllium oxide ceramic matrix is a sodium salt eutectic mixture consisting of approximately 58 mole percent sodium cyanide, 30 mole percent sodium iodide, and 12 mole percent sodium fluoride, particularly superior results are obtained with respect to cell life and operability. This preferred ternary sodium salt electrolyte composition is described and claimed in copending application S.N. 444,955, filed of even date herewith and assigned to the assignee of the present invention.

Of the suitable alkali metals, lithium, potassium, and sodium for use in the thermally regenerative cell system, the sodium-amalgam system is particularly preferred because better separation of the mercury from the sodium is obtained, and sodium has a lower vapor pressure in the system at a given regeneration temperature. In addition, corrosion at a given temperature is less in a sodium-containing system than one utilizing potassium. At a given temperature, the mixture of molten sodium salts is also less soluble, compared with potassium salts, in the metal electrodes; similarly, these metal electrodes are less soluble in the electrolyte for a sodium system than for a potassium one. Furthermore, since the equivalent weight of sodium is less than that for potassium, with approximately equal cell voltages for the two systems a given power capability will require less weight in the sodium system.

The following examples are illustrative of this invention but are not intended to restrict the scope thereof as previously described.

EXAMPLE 1

The ceramic matrix consisted of a porous beryllia disk having a thickness of 2.56 mm. and a diameter of 4.69 cm., the effective diameter being approximately 3.7 cm. It was prepared by hot pressing beryllium oxide at a temperature of 1300° F. for 1 hour, with a cold pressure of 4000 p.s.i. The apparent porosity was 40.5 percent. The disk was held between two dense beryllia rings and placed in a stainless steel frame. Approximately 10 grams of finely ground mixed sodium salt was spread evenly on the disk. The electrolyte used to impregnate the matrix initially consisted of approximately 500 grams of fused electrolyte produced by melting under vacuum a mixture of 57.8 m/o NaCN, 30.4 m/o NaI, and 11.8 m/o NaF. Two cooling periods, which were recorded on the melt, indicated that solidification started at approximately 477° C. The assembly was placed in a pressure vessel, and this was heated under vacuum to 500° C., kept at that temperature for 30 minutes, filled with argon to atmospheric pressure and kept at 490–500° C. for an additional 30 minutes. The assembly was then allowed to cool down in an argon atmosphere. This method of impregnation showed that the open surface of the disk was well impregnated on both sides. The weight of the salt taken up by the matrix indicated that all the pores between the open areas and more than one-half of the pores between the dense beryllia rings were saturated with the salt. A sodium-mercury amalgam of 54.6 m/o sodium content (339.3 g.) and pure mercury (1.800 g.) were used as electrodes.

Cell voltage and current density were measured under various loads at different temperatures in the range 430–510° C. 120–160 p.s.i.g. argon. Best performance was obtained above 490° C. with 160 p.s.i.g. pressure. The following data were obtained during cell operation:

Open circuit voltage: 0.60 to 0.62 v.
Voltage (with 0.5 ohm load): 0.49 to 0.51 v.
Current density with 0.5 ohm load: 75 ma./cm.²
Matrix resistivity: 5.9 ohm-cm.

Recharging of the cell was also investigated for a period of one hour, under optimum operating conditions. At a current density of 80/ma./cm.² the matrix resistivity was found to be approximately that found during discharge.

EXAMPLE 2

A sodium-amalgam galvanic cell was operated at a temperature between 470° C. and 510° C. The electrolyte was contained in a porous beryllia matrix separating the cathode and anode amalgams. The electrolyte consisted of a eutectic mixture of 58 mole percent sodium cyanide, 30 mole percent sodium iodide, and 12 mole percent sodium fluoride, having a melting point of approximately 475° C. The resistivity of the pure fused salt mixture was 0.5 ohm-cm. and the resistivity of the electrolyte-matrix combination was between 3.0 and 3.5 ohm-cm. The cell was operated at current densities in the range of 80 to 150 ma./cm.², with a maximum current density drawn of 360 ma./cm.² and a maximum power density of 160 mw./cm.². Cathode and anode amalgam feeds corresponding to open circuit voltages in the range 0.2 to 0.8 volt were studied. The measured voltages were found to match theoretical values. For an anode amalgam containing 50 atom percent sodium and a cathode amalgam containing 1 atom percent sodium, a voltage of 0.77 volt was obtained. With an anode amalgam content of 35 atom percent sodium and a cathode amalgam content of 10 atom percent sodium, the voltage was 0.41 volt. The cell was operated continuously for 176 hours with no evidence of cell deterioration.

It will of course be understood that various modifications can be made in the design and operation of the galvanic cell utilizing the porous beryllia matrix-electrolyte element without departing from the spirit of the invention. Thus, while the principle, preferred construction, and mode of operation of the invention have been illustrated and described, it should be understood that within the scope of the appended claims the invention may be practiced otherwise than as specifically illustrated and described.

We claim:

1. A matrix-electrolyte element for use in a thermally regenerative sodium amalgam galvanic cell comprising a porous beryllium oxide matrix containing therein an anhydrous electrolyte of a fusible salt mixture of sodium salts selected from the class consisting of tenary and quaternary salt systems and consisting essentially of at least three components selected from sodium cyanide, sodium fluoride, sodium iodide and sodium carbonate, no component being present in amount in excess of 80 mole percent, sodium carbonate being present in amount below 20 mole percent.

2. A composition according to claim 1 wherein the electrolyte is a fusible salt mixture selected from the class consisting of ternary and quaternary salt systems containing, in mole percent, 50–70 sodium cyanide, 20–40 sodium iodide, 5–20 sodium fluoride and 0–10 sodium carbonate.

3. A composition according to claim 1 wherein the electrolyte is a fusible ternary salt mixture of eutectic composition consisting essentially of, in mole percent, 58±1 sodium cyanide, 30±1 sodium iodide, and 12±1 sodium fluoride.

4. A galvanic cell for use in a thermally regenerative system comprising an anode of a sodium-rich amalgam, a cathode of a sodium-poor amalgam, and a matrix-electrolyte element separating said anode and cathode amalgams, said element comprising a porous beryllium oxide matrix containing therein an anhydrous electrolyte of a mixture of sodium salts selected from the class consisting of ternary and quaternary salt systems and consisting essentially of at least three components selected from sodium cyanide, sodium fluoride, sodium iodide and sodium carbonate, no component being present in amount in excess of 80 mole percent, sodium carbonate being present in amount below 20 mole percent, the cathode and anode amalgams and the electrolyte being molten at the normal operating temperature of the cell.

5. A galvanic cell according to claim 4 wherein the electrolyte contains, in mole percent, 50–70 sodium cyanide, 20–40 sodium iodide, 5–20 sodium fluoride, and 0–10 sodium carbonate.

6. A galvanic cell according to claim 4 wherein the electrolyte comprises a ternary salt system of eutectic composition consisting essentially of, in mole percent, 58±1 sodium cyanide, 30±1 sodium iodide, and 12±1 sodium fluoride.

7. A galvanic cell for use in a thermally regenerative system comprising an anode of a sodium-rich amalgam containing between 15 and 80 atom percent sodium, a cathode of a sodium-poor amalgam containing up to 10 atom percent sodium, and a matrix-electrolyte element separating said anode and cathode amalgams, said element comprising a high purity porous beryllium oxide matrix of at least 30 percent porosity and containing therein a ternary salt system electrolyte of eutectic composition consisting essentially of, in mole percent, 58±1 sodium cyanide, 30±1 sodium iodide, and 12±1 sodium fluoride, the cathode and anode amalgams and the electrolyte being molten at the normal operating temperature of the cell.

References Cited

UNITED STATES PATENTS

| 3,099,587 | 11/1959 | Chambers et al. | 136—86 |
| 3,147,149 | 2/1961 | Postal | 136—86 |
| 3,245,836 | 4/1966 | Agruss | 136—83 |

WINSTON A. DOUGLAS, Primary Examiner.

C. F. LeFEVOUR, Assistant Examiner.

U.S. Cl. X.R.

136—83, 153